July 5, 1966 C. D. GIBSON 3,259,365
RACK AND PINION LOAD MANIPULATOR
Filed Oct. 22, 1964 3 Sheets-Sheet 1
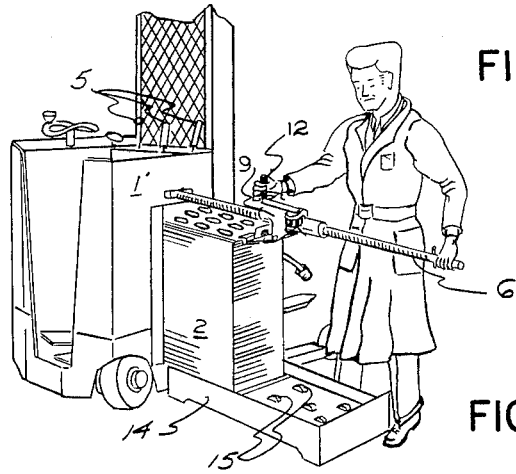
FIG. 1
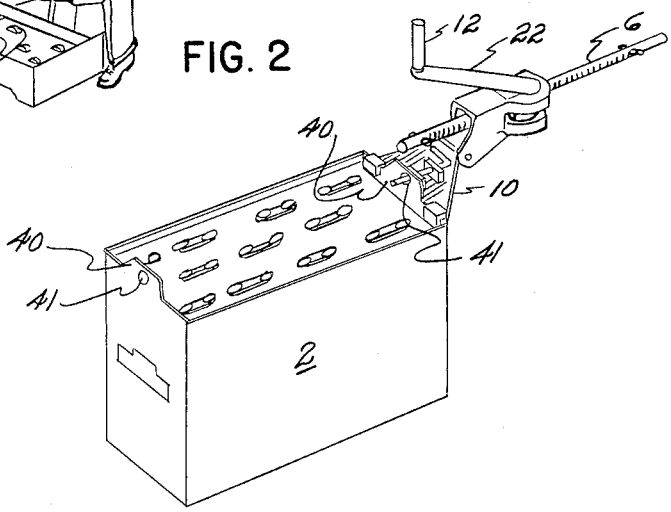
FIG. 2
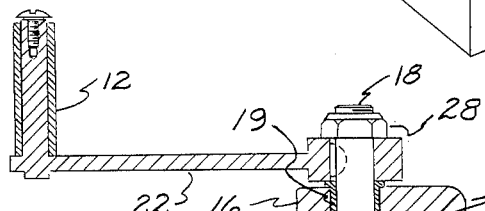
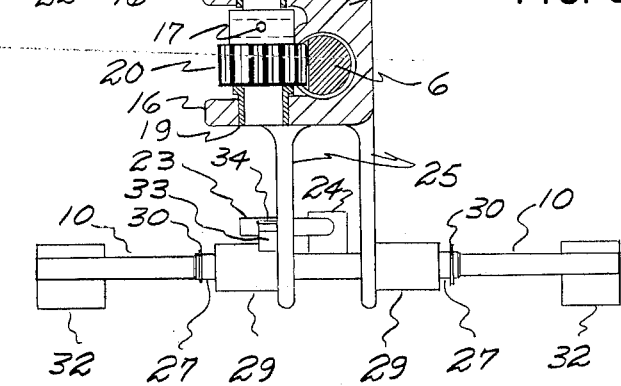
FIG. 5

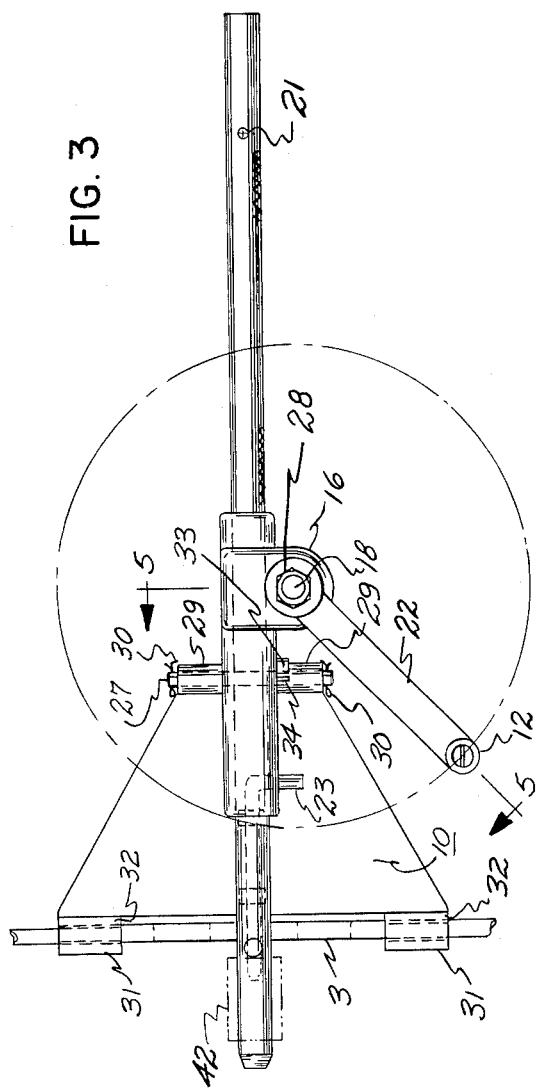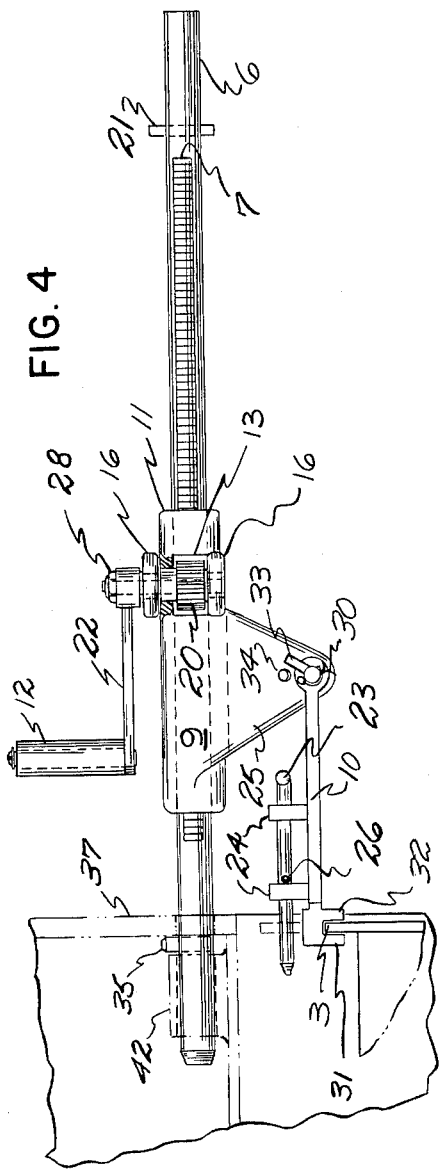

United States Patent Office 3,259,365
Patented July 5, 1966

3,259,365
RACK AND PINION LOAD MANIPULATOR
Christian D. Gibson, Greene, N.Y., assignor to The Raymond Corporation, Greene, N.Y., a corporation of New York
Filed Oct. 22, 1964, Ser. No. 405,899
6 Claims. (Cl. 254—95)

This invention relates to load-handling apparatus, and more particularly, to a novel implement for installing and removing heavy equipment into and out of machines such as lift trucks. The invention is particularly applicable to the handling of the heavy battery installations utilized in battery-powered lift trucks. Such lift trucks commonly carry very large and heavy battery installations in order to allow a truck to operate throughout a sustained period, such as an eight-hour work shift, without recharging. The battery installations commonly comprise a plurality of automotive-type storage batteries which are electrically interconnected and mounted in a battery case. The battery installations in most trucks weigh several hundreds of pounds, and some weigh nearly a ton. Such batteries frequently must be re-charged and the fluid levels of their individual cells periodically must be inspected and replenished.

The great weight of the battery installations in many trucks prevents easy manual handling, and in the prior art, overhead cranes often have been used to remove and replace battery assemblies by lifting them upwardly from the battery compartments of the trucks. The requirement that an overhead crane be provided at the battery-charging area of a warehouse is undesirable, of course, firstly because it is expensive, and secondly because it requires that each truck periodically be taken to a central battery-charging area.

For vehicle stability, it is regarded either as necessary or desirable that the heavy batteries carried on a truck be located low, as near to the floor as is reasonably possible. To minimize the overall length and width dimensions of many lift trucks, and particularly those of the "narrow-aisle" type, it is usually necessary that other equipment be installed on the truck frame above the battery compartment, in order that such other equipment add to truck height rather than to truck width or length. Commonly the battery case fills a battery compartment which extends across the entire width of the truck, with an access door at each end of the compartment. With a truck battery compartment covered by other equipment mounted above it, it has been extremely difficult, and often obviously impossible, to use overhead cranes to lift battery cases vertically to remove and replace them. In such cases it has become common to support battery cases on rollers mounted to form the bottom of the truck battery compartment, to facilitate horizontal movement of the battery case in and out of the truck. Even with such rollers, the insertion and removal of battery cases has been extremely difficult. Sometimes battery cases have been pulled horizontally out of truck battery compartments by means of cables connected to powerful winches, which frequently have been mounted on castered dollies having brakes. Such winches usually have been required to be so large that they are not easily portable. In order to pull out a battery case straight, it has been necessary to align the winch properly with respect to the truck battery compartment. Because a winch connected to a battery case by a flexible cable can only pull and not push the battery case, a winch cannot back-off the battery case if an edge of the case strikes any projecting edge, and if the battery case breaks loose and begins to emerge suddenly from the truck battery compartment, the winch and cable arrangement is ineffective to stop it once it begins to roll on the rollers. Also, because such winches can only pull, the re-installation of a battery case into a then disabled truck from which discharged batteries have been removed sometimes requires that the winch be transported around to the other side of the truck and then re-aligned with the truck battery compartment. In order to pull a battery case both in and out of a truck by means of a winch, it will be seen that the truck battery compartment must extend across the entire width of the truck and be open at each end. In some applications it is desirable that fixed structure extend from the front of the truck back past the battery compartment, and in such cases it is desirable both that one end of the battery compartment be closed, and further, that pulling cables not interfere with such fixed structure.

The primary objects of the present invention are to overcome the above-mentioned problems of the prior art. The invention comprises an elongated bar member having a toothed rack along a portion of its length. One end of the member fixedly attaches to the lift truck. A rigid link which grips an edge of a battery case is driven back and forth along the elongated bar by a crank which rotates a pinion engaging the rack. The invention provides a lightweight and portable device which easily may be carried by one workman, so that battery removal and replacement need not require the use of an overhead crane. The invention is useful for handling the battery cases of both counterbalanced trucks, the battery compartments of which may not be covered by other apparatus, and also the battery cases of other trucks, such as "narrow-aisle" lift trucks, having superstructure above their battery compartments which precludes vertical removal of a battery case from a truck. The extractor implement of the present invention allows one man to remove and replace battery cases easily, and the implement positively controls battery movement in both directions at all times.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which:

FIG. 1 is a perspective view showing one form of the invention being utilized by an operator to remove a battery case from a typical "narrow-aisle" lift truck;

FIG. 2 is a perspective view showing one form of the invention attached to a typical lift truck battery case;

FIGS. 3 and 4 are top and side views, respectively, of the extractor implement of the present invention;

FIG. 5 is a section view taken along lines 5—5 in FIG. 3; and

Figure 6:
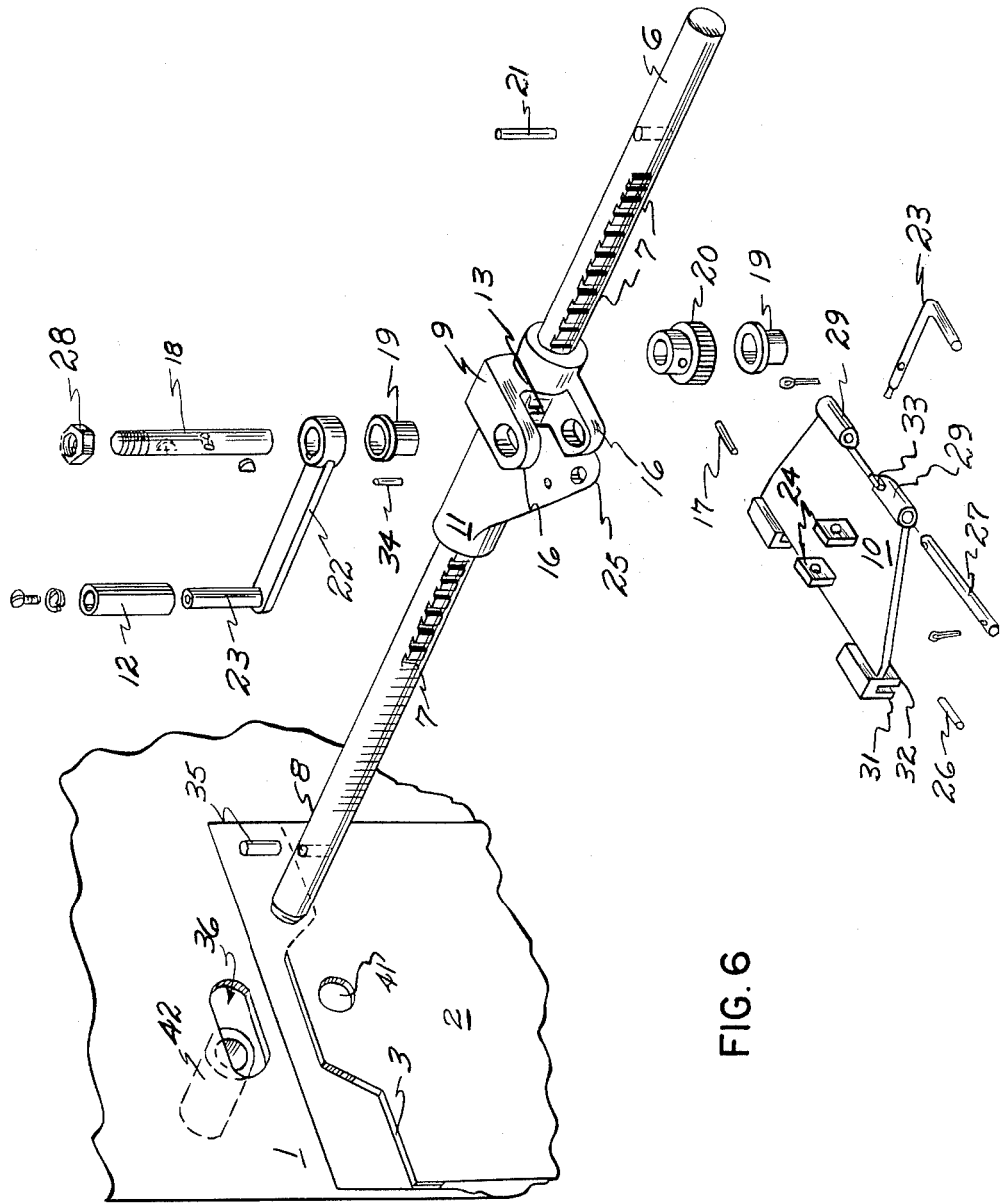
FIG. 6 is an exploded view of the extractor assembly.

In FIG. 1, an extractor implement constructed in accordance with the present invention is shown installed in position to allow battery case 2 to be installed within or removed from the battery compartment of a typical narrow-aisle lift truck 1. The battery compartment comprises a generally rectangular compartment which extends across the entire width of the truck. In order that the truck be stable, battery case 2 is mounted as low as possible on the frame of the truck, at a minimum height just necessary to clear steering linkages and the like. Inasmuch as much truck structure, including controls 5, 5 is located on the truck directly above the battery compartment, it will be seen to be impossible to remove battery case 2 from truck 1 by lifting case 2 vertically with an overhead crane. As will be evident from FIG. 1, battery case 2 is made high and narrow in order to minimize the overall length and width dimensions of the truck.

In order to remove battery case 2 from the truck, the extractor implement of the present invention connects to the truck and to an edge 3 of the battery case. The invention includes an elongated rod member 6 having a toothed rack 7 along a portion of its length, and a movable clamp member 10 which is translatable along the length of rod member 6 by rotation of crank handle 12. In order to remove battery case 2 from the truck battery compartment, crank handle 12 is rotated to move clamp member 10 outwardly, away from the truck, with clamp member 10 pulling on an edge of battery case 2 and the forward or inner end 8 or rod member 6 pushing on fixed structure of the truck, thereby pulling battery case 2 out of the truck battery compartment onto platform 14, which is provided with rollers, such as those shown at 15, 15. The bottom of the truck battery compartment is conventionally provided with similar rollers (not shown). In order to replace the battery case within the battery compartment after the batteries have been serviced, the extractor implement is again positioned in the manner shown in FIG. 1, and crank handle 12 is rotated in the opposite direction. Clamp member 10 then pushes the edge of case 2 inwardly, with the inner end 8 of rod member 6 being urged outwardly against fixed structure of the truck, so that battery case 2 is urged back into the truck battery compartment. As will be seen below, the position of clamp member 10 on rod member 6 is determined by a direct gearing connection between crank handle 12 and rack 7 on member 6, so that the battery case may be urged in either direction irrespective of whether the case in intended to be extracted or re-installed. If an edge of case 2 strikes an edge of the battery compartment while the battery is being extracted (which sometimes may occur if the battery case is not positioned precisely straight in the truck battery compartment), crank 12 may be operated through several revolutions in a reverse direction, battery case 2 pried to a straighter position, by means of a crowbar or the like, and then crank 12 operated again to extract battery case 2 from the truck battery compartment.

If the truck and/or roller platform 14 are not situated on perfectly level floors, it will be seen that there may be a tendency for the battery case to roll in one direction or the other. If the floor under the truck slants slightly in one direction, so that the battery case must be moved slightly "uphill" in order to remove the battery, the battery case will tend to roll back down into the truck battery compartment, which may be quite dangerous when manual manipulation of the battery case is attempted, as has been done in the prior art. If the floor under the truck slants slightly in the opposite direction, so that the battery case rolls "downhill" once it is started, it is important that the battery case be removed slowly, in order that it not tip over platform 14. It will be seen that the present invention, because it gears clamping member 10 directly to rod member 6 via crank handle 12, allows the battery case to be controlled continuously, thereby preventing the battery case from rolling uncontrollably either into or out of the truck battery compartment. It may be noted that the extractor implement is easily operated by either left-handed or right-handed persons, and readily adaptable for use on either or both sides of a truck. It also may be noted that because the extractor of the present invention acts between the truck itself and the battery case rather than mounting on the floor or elsewhere, no brakes need be provided and no connections need be made to any building structure.

As better seen in FIG. 2, a typical battery case 2 comprises a rigid metal case having an open top. A pair of tabs 40, 40 extend above the top edge of the case at opposite ends to accommodate either a sling or a bar (not shown) to which a sling may be attached, with the bar extending across the top of the case through holes 41, 41 in tabs 40. In FIG. 2 the extractor implement of the present invention is shown positioned to grip the edge of battery case 2 on opposite sides of the tab 40 on one end of case 2, and a locking pin 23 is shown protruding through hole 41 in that tab, for a purpose to be described below.

As better seen in FIGS. 3–6, the extractor includes an elongated rod member 6 shown as comprising a steel bar of circular cross section having a toothed rack 7 extending along most of its length. Typical dimensions of bar 6 are 5 feet of length and 1″ in diameter. Movable casting 9 having a tubular sleeve portion 11 is provided with a through bore to slidingly mount casting 9 on bar 6. A pair of mounting ears 16, 16 extending in one direction from casting 9 are provided with bushings 19, 19 in which shaft 18 is journalled. Pinion 20 is provided with a collar portion of reduced diameter which is pinned to shaft 18 by means of pin 17, and the teeth of pinion 20 mesh with the teeth of rack 7 on bar 6, an opening 13 being provided in casting 9 between ears 16. The collar portion of pinion 20 will be seen to limit axial translation of shaft 18 once it is pinned to shaft 18. Crank arm 22 is keyed to shaft 18, and held on the end of shaft 18 by bolt 28 threaded onto the upper end of shaft 18. An upwardly-extending post 23 on crank arm 22 rotatably carries crank handle 12 which comprises a hollow sleeve. It will be seen that rotation of crank arm 22 in one direction or the other will translate casting 9 in one direction or the other along bar 6. Because the length of crank arm 22 is much greater than the diameter of pinion 20, a considerable mechanical advantage may be obtained. In a typical embodiment of the invention, crank arm 22 has a length of approximately six inches and pinion 20 has a pitch circle diameter of about .75 inch, giving a mechanical advantage of approximately 8:1.

Casting 9 is provided with a further pair of depending ears 25, 25 between which a further shaft 27 is journalled, and hinge bearing portions 29, 29 of clamp member 10 are pivotally mounted on shaft 27. Means shown as comprising cotter pins 30, 30 limit axial movement of shaft 27. The outer edge of pivotally mounted clamp member 10 includes two pairs of spaced depending flanges 31, 31 and 32, 32 which seat on opposite sides of edge 3 of battery case 2, inner flanges 31, 31 urging battery case 2 outwardly from the truck when crank arm 22 is turned in one direction, and outer flanges 32, 32 urging battery case 2 inwardly when the crank arm is moved in the opposite direction. In FIGS. 3 and 4 the depending flanges 31, 31 and 32, 32 are shown seated on edge 3 of battery case 2. It is desirable that flanges 31, 31 and 32, 32 have considerable width in order to grip edge 3 of case 2 along a widened area rather than at a point in order that the powerful forces applied to case 2 by the extractor not rip edge 3 of sheet metal case 2. It is also desirable that the flanges be situated on both sides of bar 6, so that battery case 2 will be pushed and pulled evenly.

In order that the force applied by the extractor implement act between the battery case and the truck, the inner end 8 of bar 6 is adapted to be easily attachable to and detachable from fixed structure of the truck. While it is highly desirable that the end of bar 6 be readily attached to and detached from the truck, it is necessary that bar 6, when attached, be held securely against both inward and outward movement. It is also highly desirable that no attachment apparatus be required to be fixedly mounted on the outside of the truck to add to truck width.

In accordance with the invention, a pin 35 is fastened in circular bar 6 to project radially therefrom. As best seen in FIG. 6, an elongated opening 36 is provided in the outer wall 37 of the truck. The vertical height of opening 36 is only slightly larger than the diameter of circular bar 6, but the width of opening 36 is larger than the diameter of bar 6 and the radially projecting length of pin 35. By rotating the entire extractor assembly about the axis of bar 6, so that pin 35 extends in the widened direction of opening 36, the inner end of bar 6 and pin 35 may be inserted through opening 36, and then if the assembly is rotated back to an angular position where pin 35 extends in a direction in which opening 36 is narrower, such as the position shown in FIG. 4, pin 35 will engage the inside of wall 37 of the truck and bar 6 will be prevented from moving outwardy away from the truck. Pin 35 is pressed tightly against the inside of wall 37 when crank arm 22 is rotated to urge casting 9, and clamp member 10 toward the truck to move a battery case into the truck battery compartment. It will be apparent that opening 36 may take other forms than that shown. For example, an opening having the shape of the combined cross-section of bar 6 and pin 35 may be provided, so that the assembly must be rotated to a particular angle in order to pass pin 35 through the opening, but so any other angular orientation of the assembly prevents pin 35 from passing through the opening.

In order to prevent inward movement of bar 6 when a battery case is being extracted, a short hollow cylindrical sleeve or socket 42 is fixedly mounted to the truck to accommodate the end of bar 6. Socket 42 has an internal diameter slightly larger than the portion of bar 6 beyond pin 35. It will be seen that when bar 6 is urged inwardly toward the truck, which occurs when the battery case is being extracted from the truck, pin 35 will engage socket 42, preventing inward movement of bar 6. As well as providing an inward stop for bar 6, cylindrical sleeve or socket 42 will be seen to support bar 6, so that the operator need not hold up the weight of the extractor assembly. During the removal or the installation of a battery case, the operator may interrupt his task at any time but still leave the extractor locked in place, and later when he resumes removing or installing the battery case, he merely needs to resume operation of crank handle 12. As shown in FIGS. 4 and 6, the inner end of bar 6 is chamfered to facilitate insertion of the end of bar 6 into sleeve 42. As well as providing an inward bearing surface or stop, and as well as serving to support the weight of the extractor, it will be seen that sleeve 42 serves automatically to align the direction of bar 6 when the extractor is installed in place, thereby automatically insuring that the case is pulled or pushed in a predetermined direction, straight out of or into the truck battery compartment. As a battery case is moved into or out of a truck battery compartment off of or onto rollered platform 14 (FIG. 1), the case must be raised and lowered slightly. To accommodate such vertical variation in the position of edge 3 of battery case 2, clamp member 10 is pivotally mounted on shaft 27, as described above.

To prevent clamping plate 10 from pivoting upwardly and slipping off the edge of the battery case when a force is applied to move the battery case, lock pin 23 is mounted on clamp member 10 is pedestals 24, 24, to slide into and out of hole 41 in the upwardly extending tab 40 of the battery case. Pin 23 may be fitted in pedestals 24, 24 so that friction holds pin 23 in the position to which it is slid. Pin 26 inserted into lock pin 23 between pedestals 24, 24 prevents accidental removal and loss of lock pin 23 and limits rearward and forward travel of lock pin 23. Once flanges 31, 32 have been lowered onto edge 3 of the battery case, and once lock pin 23 has been slid forward to extend through hole 41, it will be seen that upward pivotal movement will be limited by lock pin 23 engaging the upper edge of hole 41, and thus pivotally mounted clamp member 10 may be prevented from pivoting upwardly to a point where flanges 31, 31 or 32, 32 will slip off of edge 3 of the battery case.

When the extractor implement is being connected to a battery case and to a truck, the position of bar 6 is determined by position of the side of the truck, and the crank handle must be rotated to move casting 9 and pivoting clamp plate 10 the proper distance inwardly or outwardly to position flanges 31, 31 and 32, 32 on opposite sides of edge 3 of the battery case. If the clamp plate extends generally horizontally, in the approximate pivotal position it will have when seated on edge 3 of the battery case, the operator finds it much easier to judge how much he should crank the assembly in or out to locate the flanges 31, 32 over the battery case edge than if pivoting plate 10 were allowed to hang downwardly. Therefore, an angularly extending tab 33 is provided on a hinge bearing 29 to engage stop pin 34 and limit the downward swing of pivotal clamping plate 10.

While a toothed rack has been shown on bar member 6 meshing with a rotatable pinion, it will be apparent to those skilled in the art that instead a length of roller chain may be fixed along bar 6 to engage a sprocket carried on movable casting 9. The chain may be recessed in a slot extending along bar 6. The rack-pinion connection shown automatically prevents rotation of casting 9 about bar 6. If a roller chain-sprocket drive is substituted, a bar 6 is preferably made non-circular and the bore through housing 9 made non-circular to avoid rotation of assembly 9 about bar 6.

It will thus be seen that the objects set forth above, among those made apparent from the preceding description, are efficiently attained, and since certain changes may be made in the above construction without departing from the scope of the invention, it is intended that all matter contained or shown in the accompanying drawings shall be interpreted as illustrative and not in a limiting sense.

Having described my invention, what I claim as new and desire to secure by Letters Patent is:

1. A portable implement for moving a battery case in and out of a battery-powered lift truck, comprising, in combination:
   a rigid elongated member having a toothed rack means along a portion of its length and means operable by rotation of said elongated member for rigidly but detachably attaching one end of said elongated member to said lift truck;
   a movable member slidably mounted on said elongated member;
   a rotatable pinion journalled in said movable member and engaging said toothed rack;
   a crank connected to rotate said pinion;
   a rigid link pivotally connected to said movable member and adapted to connect to said battery case;
   and means for limiting pivoting of said rigid link.

2. An implement for moving a load in and out of a compartment of a vehicle, comprising, in combination:
   an elongated member having a toothed rack along a portion of its length and a pin means projecting radially from said elongated member, said pin means being operable upon rotation of said elongated member to lock and unlock said elongated member to a portion of said vehicle;
   a movable member slidably mounted on said elongated member;
   a rotatable pinion journalled in said movable member and engaging said toothed rack;
   a crank connected to rotate said pinion;
   and clamping means pivotally mounted on said movable member to pivot about an axis perpendicular to the axis of said elongated member, said clamping means having flange means adapted to grip said load.

3. Apparatus according to claim 2 in which said vehicle includes a cylindrical socket and in which said elongated member includes a portion of circular cross section adapted to fit rotatably and slidingly in said socket, thereby to align said elongated member in a predetermined direction with respect to said compartment and to support said elongated member.

4. Apparatus according to claim 2 having a movable lock pin adapted to engage a portion of said load to prevent said flange means from slipping off of said load.

5. Apparatus according to claim 2 having stop means to limit pivotal movement of said clamping means about said axis.

6. A portable implement for moving a battery case in and out of a battery-powered lift truck, comprising in combination:
- a rigid elongated member having means on one end for rigidly attaching and detaching said one end of said member to and from said lift truck, said elongated member having toothed rack means disposed along a portion of its length;
- a movable member slidably mounted on said elongated member and constrained against rotation around said elongated member;
- rotatable pinion means journalled in said movable member and engaging said toothed rack;
- a crank connected to rotate said pinion;
- and clamping means pivotally connected to said movable member and adapted to connect to said battery case, said clamping means extending on both sides of said elongated member and adapted to bear against portions of said battery case.

References Cited by the Examiner
UNITED STATES PATENTS

| | | | |
|---|---|---|---|
| 1,023,400 | 4/1912 | Swarm | 254—66 |
| 1,427,642 | 8/1922 | Rickard | 254—97 |
| 1,764,355 | 6/1930 | Schellentrager et al. | 204—34 |
| 1,939,480 | 12/1933 | Wilson | 254—95 X |

WILLIAM FELDMAN, *Primary Examiner.*
OTHELL M. SIMPSON, *Examiner.*